United States Patent [19]
Miller et al.

[11] Patent Number: 5,422,970
[45] Date of Patent: Jun. 6, 1995

[54] TEMPERATURE COMPENSATED FIBER FABRY-PEROT FILTERS

[75] Inventors: Calvin M. Miller, Atlanta; Jeffrey W. Miller, Smyrna, both of Ga.

[73] Assignee: Micron-Optics, Inc., Atlanta, Ga.

[21] Appl. No.: 161,702

[22] Filed: Dec. 3, 1993

Related U.S. Application Data

[63] Continuation-in-part of Ser. No. 929,836, Aug. 12, 1992, Pat. No. 5,289,552, and a continuation-in-part of Ser. No. 135,679, Oct. 13, 1993, Pat. No. 5,375,181.

[51] Int. Cl.$^6$ .............................................. G02B 6/38
[52] U.S. Cl. ...................................... 385/72; 385/66; 385/73
[58] Field of Search ..................... 385/53, 55, 56, 58, 385/59, 60, 64, 65, 69, 70, 71, 72, 75, 73, 66, 84

[56] References Cited

U.S. PATENT DOCUMENTS

| | | | |
|---|---|---|---|
| 4,258,977 | 3/1981 | Lukas et al. | 385/60 |
| 4,448,482 | 5/1984 | Lathlaen | 385/64 |
| 4,490,007 | 12/1984 | Murata | 385/64 |
| 4,545,644 | 10/1985 | DeVeau, Jr. et al. | 385/64 |
| 4,629,284 | 12/1986 | Malavieille | 385/70 |
| 4,787,701 | 11/1988 | Stenger et al. | 385/70 |
| 4,813,756 | 3/1989 | Frenkel et al. | 385/73 |
| 4,830,451 | 5/1989 | Stone | 385/31 |
| 4,861,136 | 8/1989 | Stone et al. | 385/27 |
| 4,923,273 | 5/1990 | Taylor | 385/48 |
| 5,037,179 | 8/1991 | Bortolin et al. | 385/54 |
| 5,062,684 | 11/1991 | Clayton et al. | 385/27 |
| 5,073,004 | 12/1991 | Clayton et al. | 385/27 |
| 5,212,745 | 5/1993 | Miller | 385/25 |
| 5,212,746 | 5/1993 | Miller et al. | 385/25 |
| 5,375,181 | 12/1994 | Miller | 385/27 |

FOREIGN PATENT DOCUMENTS

| | | | |
|---|---|---|---|
| 0437963 | 7/1991 | European Pat. Off. | G01J 3/26 |
| 0457484 | 11/1991 | European Pat. Off. | G02B 6/26 |

OTHER PUBLICATIONS

2Miller et al. (Dec. 1990) Elect. Lett. 26(25): 2122-2123, "Fibre Fabry-Perot Filter ... ".

Stone et al. (Jul. 1987) Elect. Lett. 23(15): 781-783, "Pigtailed High-Finesse Tunable Fiber Fabry-Perot .. .".

M. A. Hunter (1961) Metals Handbook, American Society of Metals, 8th Ed. (Taylor Lyman, ed.) vol. I, pp. 816-819 (no month available).

*Primary Examiner*—Frank Gonzalez
*Attorney, Agent, or Firm*—Greenlee & Winner

[57] ABSTRACT

Improved ferrule alignment fixtures for use in fiber Fabry-Perot (FFP) filters are provided. The inventive alignment fixtures have ferrule holders with shaped passageways for holding fiber-containing ferrules in three-point contact which allow fiber alignment using a rotary alignment technique.

The FFPs have a fiber ferrule assembly which when aligned in the inventive ferrule holder forms an optical cavity between mirrors transverse to the fiber in the ferrule assembly. Wavelength tunable FFPs have a piezoelectric transducer interposed between the ferrule holders which can be used to change the length of the optical cavity and tune the filter.

24 Claims, 9 Drawing Sheets

TEMPERATURE COMPENSATED FIBER FABRY-PEROT FILTERS

This application is a continuation-in-part of U.S. patent applications Ser. No. 07/929,836, filed Aug. 12, 1992, now U.S. Pat. No. 5,289,552 issued on Feb. 22, 1994 and Ser. No. 08/135,679, filed Oct. 13, 1993, now U.S. Pat. No. 5,375,181 both of which are incorporated in their entirety by reference herein.

FIELD OF THE INVENTION

This invention is in the field of fiber optics and relates specifically to ferrule holders and ferrule alignment fixtures useful in fiber Fabry-Perot filters (FFPs). The holders and fixtures of this invention are also useful to provide temperature compensated FFPs.

BACKGROUND OF THE INVENTION

Transmission of information by the use of light over optical fibers is widely used in long-haul telecommunication systems. Optical signals are generated, transported along optical fibers and detected to regenerate the original electronic signal with as little change as possible. Fibers are substituted for other transmission media and all signal processing is done electronically, resulting in lowered cost and high quality digital transmission.

As fiber optic applications technology develops direct optical processing of signals without conversion to electronic signals will be required. Optical fiber systems will be applied in computer networks, for example, in multiple access computer networks. Such applications require optical fiber devices such as amplifiers, multiplex/demultiplexes, splitters, couplers, filters, equalizers, switches and other optical signal processors. An economical low-loss, easily and reproducibly manufactured single-mode optical fiber filter, the design of which can be adapted to a desired bandwidth, FSR and finesse is an important component for such fiber optic systems. A fiber Fabry-Perot (FFP) interferometric filter is such a component.

FFPs which possess optical properties suitable for telecommunication applications have been described. These FFPs consist of two highly reflective, preferably plane-parallel mirrors, forming the optical cavity through at least a portion of which, in most cases, a length of single-mode optical fiber extends. This basic design eliminates the need for collimating and focusing lenses, improves stability and optical performance and makes the FFPs compatible with single-mode optical fibers and other fiber devices.

The transmission characteristics of a typical FFP of length, $l_c$, have been described, for example see the description in C. M. Miller U.S. Pat. No. 5,212,745. An FFP is tuned between successive resonance maxima by, for example, changing the optical cavity length, $l_c$. (Alternatively, tuning of the FFP can be accomplished by changing the index of refraction, n.) The bandwidth (BW) is the full width at half maximum. The finesse of the filter, $F=FSR/BW$, can be measured experimentally by measuring the ratio of FSR to BW from the transmission curves generated by varying $l_c$ with constant wavelength, $\lambda$. Measuring F in this manner accounts for all non-dispersive losses including mirror absorption, diffraction and alignment losses. If $\lambda$ is varied to generate transmission curves, dispersive properties of the mirrors, fibers, and cavity modes are also included in the measured FSR.

J. Stone and L. W. Stulz (1987) Elect. Lett., 23(15):781–783 described three configurations of FFP interferometric filters. A Type I FFP is a long cavity FFP having mirrors deposited at the ends of a continuous fiber. Stretching the fiber, for example using piezoelectric transducers (PZTs), tunes the bandwidth (BW) over the free spectral range (FSR). A Type II FFP is a gap resonator, formed between two opposed mirror-ended fiber ferrules. Since there is no optical fiber inside the optical cavity, signal loss increases significantly with cavity length and the useful cavity length of this type of FFP is less than about 5 μm. A Type III FFP has an internal fiber-containing waveguide positioned between two fiber ferrules each of which has a fiber end. The optical cavity is formed between a mirrored-end of one ferrule and a mirror at the end of the waveguide remote from the mirror-ended ferrule and the fiber of the waveguide is within the optical cavity. There is also at least one fiber gap within the cavity, for example between the waveguide and the mirror-ended ferrule. The length of the fiber gap can be varied to tune the filter.

The type III FFP is generally better suited to telecommunication applications than either of the other types of FFPs.

The ferrule components and waveguide of Type II and III FFPs must be axially aligned to high precision in order to minimize transmission loss. Type II and III FFPs tuned using PZTs to change cavity length are the subject of U.S. Pat. No. 4,861,136. Elaborate alignment brackets and fixtures were necessary to change cavity length without detriment to fiber alignment.

U.S. Pat. No. 5,062,684 describes tunable or fixed FFP filters in which the resonance cavity is formed by two wafered ferrules with mirrors embedded between the wafer and the ferrule and axially disposed optical fibers. The two ferrules are positioned in the filter configuration with mirrors opposed and the optical fibers of the ferrules aligned. The resonance cavity formed between the embedded mirrors contains a fiber gap between the wafered ends of the ferrules. The ferrule combination is held in alignment by an alignment fixture which can include PZTs to change the cavity length and tune the filter. A support fixture useful for holding a FFP ferrule assembly in axial alignment which includes PZTs for changing the cavity length and means for adjustment of alignment is described in EP patent application 0 457 484.

C. M. Miller U.S. Pat. No. 5,212,746 describes improved fixed or tunable single-wafered ferrule FFP filters in which an optical cavity is formed between a mirror-ended ferrule and a wafered ferrule with an embedded mirror.

G. F. De Veau and C. M. Miller U.S. Pat. No. 4,545,644 describe a rotary mechanical splice ferrule alignment fixture. This fixture comprises a plurality, typically three, alignment rods held within a spring bracket. At least one of the alignment rods, preferably two in a three-rod splice, includes a "flat", as defined in that patent extending along the rod from one end for a substantial fraction of the length of the rod. Ferrules are inserted into the splice and the fibers of the ferrules aligned therein using a rotary alignment technique as described in the patent. The "flat" portions on the alignment rods provide an alignment fixture offset necessary for rotary alignment. Once alignment is adjusted it is maintained by establishing a multi-point (preferably three-point) pressure contact of the alignment rods with the ferrule. C. M. Miller U.S. Pat. No. 5,212,745 describes a temperature tunable FFP which employs a rotary mechanical splice fixture. The rotary mechanical splice fixture has not been used in FFPs tuned using PZTs.

In prior art FFPs tuned with PZTs, the fibers in a ferrule assembly are aligned by adjusting the relative tightness of set screws around the circumference of one or both of the ferrule holders. These screws contact the ferrule directly or indirectly via an intermediate sleeve. See EP patent application 0 457 484, U.S. patent 19-91, 20-91, 2-92 and 24-93.

Signal loss due to wavelength drift and increased insertional loss as a function of temperature can be a significant problem in FFPs. An uncompensated FFP, like that of U.S. Pat. No. 5,062,684 or EP application 0 457 484, can exhibit a relatively large change in cavity length with temperature, of the order 0.05 $\mu$m/°C. This can represent a drift of a full FSR (free spectral range) over 15° C. See C. M. Miller and F. J. Janniello (1990) Electronics Letters 26:2122–2123.

Control circuitry can be used with PZT-tuned FFPs to lock the filter onto a wavelength over a wide temperature range (I. P. Kaminow (1987) Electronics Letters 23:1102–1103 and D. A. Fishman et al. (1990) Photonics Technology Letters pp.662–664). These systems can require control voltage swings of several tens of volts to compensate for variations of cavity length with temperature. A high voltage power supply capable of providing 60 volts was needed to maintain a wavelength lock over a temperature range of about 30° C. (Fishman et al. supra).

Miller and Janniello (1990) supra describe passive temperature compensation of PZT-tuned FFPs using aluminum blocks. Since PZTs require a higher voltage at higher temperature to maintain a given length, cavity length effectively decreases with increasing temperature (with constant voltage). Thus, a PZT-tuned FFP has a negative temperature coefficient. Addition of a material, like aluminum, having a positive temperature coefficient in series with the PZTs compensates for the negative temperature coefficient of the PZTs. Passive compensation significantly reduced the voltage requirements for FFP locking circuits so that +/− 12 volt power supplies, such as are conventionally employed in computer systems, can be employed for locking.

C. M. Miller et al. U.S. patent application Ser. No. 07/929,836, now allowed, reports that it is important to use controlled thicknesses of positive temperature coefficient adhesives, such as epoxy, when constructing FFPs to obtain consistent temperature compensation. This application also described ferrule holders for use in PZT-tuned FFPs in which the temperature coefficient of the FFP can be adjusted after its construction by changing the points of contact between the ferrule and its holder. This technique significantly improved the production yield of highly accurate, passively compensated FFPs significantly reducing over or under compensation of the FFPs. PZT-tunable FFPs which display wavelength drift less than 1 FSR/100° C. (−25° C. to 85° C.) and less than 1 dB insertion loss over the same temperature range have been constructed. These FFPs, however, employ set screw adjustment for fiber alignment. This method requires more time and skill to achieve good alignment and is less accurate and stable than the rotary alignment method.

Thus, there is a need in the art for alignment fixtures and component ferrule holders for PZT-tunable FFPs having improved means for fiber alignment which retain excellent thermal and optical properties.

In some applications, such as for mounting on circuit boards, it is desirable to minimize the size of an FFP. Circuit board application require FFPs less than or equal to about 6.8 mm in height, due to standard board spacing. Thus, there is a general need in the art for FFPs which can be miniaturized for such applications.

SUMMARY OF THE INVENTION

It is an object of this invention to provide FFPs with improved means for alignment of optical fibers. Specifically, this invention provides ferrule holders, for use as components of FFPs, in which the optical fibers can be readily aligned using the rotary alignment method that has been applied previously in rotary mechanical splice fixtures.

It is a more specific object of this invention to provide PZT-tunable FFPs with such improved alignment means.

The inventive ferrule holders comprise a unitary body having a shaped passageway therethrough for receiving a ferrule. The passageway is shaped along its longitudinal length to provide flat regions for three-point contact between the ferrule and the passageway. The holder also has a means for securing the ferrule in the passageway in a line along the length of the ferrule. This securing means provides one line of the three-point contact along the length of the ferrule. The securing means allows force to be applied indirectly to the ferrule along this contact line to establish the three-point contact with the passageway. Each flat preferably provides a point of perpendicular contact between the surfaces of the ferrule cylinder and the body of the holder in a line along the ferrule length.

Preferred passageways are shaped so that the three flats are equiangularly distributed in the passageway around the circumference of the ferrule. The passageway may, for example, be triangular, partially cylindrical with significant flat portions or generally cylindrical with relatively narrow flat portions. Passageway shapes that minimize the height and width of the holder are preferred. Any passageway shapes that allow for three-point contact between the ferrule and passageway are intended to be within the scope of this invention.

More specifically, the ferrule holders of this invention incorporate a means for securing the ferrule in the holder which comprise a means for indirect application of a radial force on the ferrule substantially directed toward the axis of the ferrule. Application of the radial force is mediated to the ferrule by a ferrule retention means. For example, the means for securing the ferrule can comprise a plurality of tapped holes for receiving screws in a line along the ferrule body. Radial force is applied by tightening a screw to contact the intermediate ferrule retention means which in turn contacts the ferrule. Application of the radial force urges the ferrule downward in the passageway to establish a secure three-point contact with the passageway. The intermediate ferrule retention means can be comprised of one or more elements. The ferule retention means can for example have a resilient arm extending from the body of the holder or a separate moveable element retained within a retaining channel adjacent to the ferrule passageway. Alternatively, the ferrule retention means can comprise both a resilient arm and a separate channel element between the arm and the bottom of the tapped hole. Radial force is applied to the outer side of the ferrule retention means and as a result the inner side of the element contacts the ferrule. In specific embodiments, the inner side of the element provides one of the three flats along the ferrule passageway.

PZT-tuned FFPs of this invention comprise two ferrule holders bonded to an intermediate PZT such that application of a voltage to the PZT changes the optical cavity length and tunes the FFP. Ferrule holders used for PZT-tuned FFPs have a means for receiving and bonding to a PZT at one longitudinal end. The FFPs of this invention preferably employ cylindrical PZTs having a cylindrical passageway therethrough. A ferrule holder can, for example, have a flange of a diameter sized to engage the passageway of the PZT. The flange facilitates bonding of holders to the PZT and protects the optical cavity from excess adhesive. The holders and PZT are bonded to each other using controlled thicknesses of adhesive, typically epoxy. The unitary body ferrule holders of this invention can generally be employed in any FFP, such as those tuned by varying temperature or refractive index.

It has been found that it is unnecessary to specifically provide an alignment fixture offset within the FFP to facilitate rotary alignment of the fibers as was required in rotary mechanical splice fixtures. Such an offset can be provided when constructing the FFP if it is desired.

Alternatively, the ferrule holder of this invention can be elongated to receive two ferrules at either of its longitudinal ends. The two ferrule holders then can function as a fiber splice or as a non-PZT tuned FFP. Other means for tuning FFPs including controlled temperature variation and variation of refractive index can then be employed.

It is a further object of this invention to provide temperature compensated FFPs in which the fibers can be aligned using the rotary alignment technique. Temperature compensation of the FFP is achieved by selection of materials for the holder components to substantially match the thermal expansion coefficient of the ferrule material. Specifically, low-expansion metal alloys having thermal expansion coefficients less than about 7.5 ppm/°C. are used to fabricate the ferrule holder. Generally, the material of the holder is selected to have a thermal expansion coefficient that is within a factor of 2 of that of the ferrule material. More preferably the material of the holder is selected to have a thermal expansion coefficient within ±50% of the value of that of the ferrules. For example for use with Pyrex TM ferrules, low-expansion alloys having a thermal expansion coefficient between about 7.2 and 1.8 ppm/°C. and more preferably between about 5.4 to 1.8 ppm/°C. can be employed. The particular alloy selected depends on the material used for other components of the holder, e.g. ferrule retention elements and screws.

If possible all holder components should be closely matched in thermal expansion coefficient to the ferrule material. Alternatively, the holder components can be selected to compensate for any mismatch in thermal expansion coefficient between the body and the ferrule.

For Pyrex TM ferrules, a preferred holder is fabricated from a low-expansion alloy having a thermal expansion coefficient of about 5 ppm/°C., such as Kovar TM, when low-expansion coefficient (10.3 ppm/°C.) stainless steel is used for the screws. The stainless steel screws compensate for the mismatch in expansion coefficient between the Pyrex TM ferrules and the Kovar TM body. Materials of the body and other components of the holder are selected to minimize any change in the magnitude and direction of the force on the ferrule as a function of temperature over the range −20° to +85° C.

It is also an object of this invention to provide PZT-tunable FFPs which provide for rotary alignment of ferrules and provide a means for adjusting the longitudinal thermal expansion coefficient of the filter after the filter is constructed. In FFPs, having the inventive ferrule holders in which at least one of the components of the ferrule retention means is fabricated from a material having a thermal expansion coefficient greater, i.e. more positive, than that of the body of the holder, the longitudinal thermal expansion of the filter is adjustable by changing the points of contact along the length of the ferrule between the ferrule, ferrule retention means and the holder body. In specific embodiments, the thermal expansion coefficient of the filter is adjusted by tightening and/or loosening screws along the ferrule holder length.

It is yet another object of this invention to provide miniaturized PZT-tunable FFPs which can be constructed to have a height equal to or less than about 6.8 mm. Such FFPs are useful, for example, in circuit board applications.

Other objects and benefits of this invention will be readily apparent to those of ordinary skill in the art upon consideration of the following non-limiting drawings and descriptions.

DETAILED DESCRIPTION OF THE INVENTION

Figure 1:
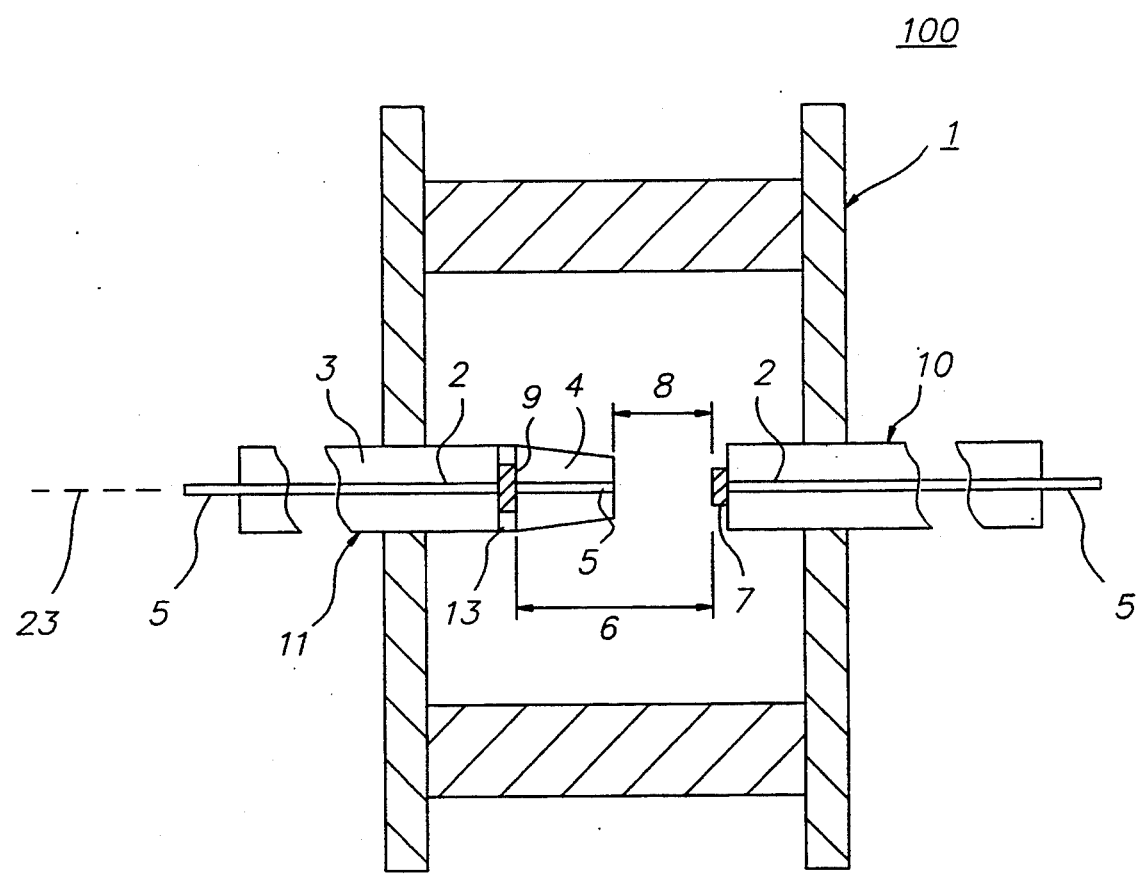
FIG. 1 is an exemplary FFP fiber ferrule assembly. In this case a single wafered-ferrule assembly in which the optical cavity is formed by opposing a wafered ferrule with an embedded mirror and a mirror-ended ferrule is shown.

FIG. 1 schematically shows a typical FFP filter configuration (100) with two ferrules (10 and 11) aligned within a supporting fixture (1). Each ferrule contains a substantially axial bore (2) along a longitudinal axis (23) for receiving an optical fiber (5). The FFP shown contains a wafered ferrule (11) in combination with a mirror-ended ferrule (10), a single wafered-ferrule assembly. The wafered ferrule has a mirror (9) embedded between the ferrule (3) and the wafer (4). The axial optical fibers of the wafer and the ferrule are aligned and the two elements are bonded with epoxy (13). The embedded mirror (9) and the mirror (7) deposited at the end of ferrule (10) form the resonance cavity of the FFP filter, indicated by 6. In the FFP exemplified in FIG. 1, there is a small gap in the optical fiber (8) within the resonance cavity. The length of this gap is varied to tune the wavelength transmitted through the filter. The optical fibers of the ferrules of the FFP are aligned so that an optical signal can traverse the filter. The single-wafered ferrule assembly of FIG. 1 has been described in C. M. Miller U.S. Pat. No. 5,212,746, which is incorporated by reference herein. The details of preparation of FFP ferrule assemblies and in particular the details of preparation of wafered ferrules with embedded mirrors and mirror-ended ferrules are given therein. Alternative FFP ferrule assemblies having a fiber gap within the resonance cavity include those having two mirror-ended ferrules or two wafered ferrules with embedded mirrors. FFP filters can also have a continuous fiber throughout the resonance cavity. In a FFP having a continuous fiber, the filter is tuned by stretching that fiber. The details of construction of ferrules, and ferrule assemblies, the deposition of mirrors, and the characteristics of various fiber ferrule configurations for FFPs are well-known in the art and have also been discussed, for example, in U.S. Pat. Nos. 5,212,745, 5,062,684, and 4,861,136. FFP mirrors have typically been produced by deposition of multiple layers of quarter-wavelength stacks of $Si/SiO_2$. Improved low-loss FFPs can be produced by use of mirrors formed by deposition of multiple layers of $TiO_2/SiO_2$, as described in J. Stone and L. W. Stulz (1991) Electronics Letts. 27(24):2239–40.

Various fiber ferrule configurations can be employed in the FFPs of this invention. The single wafered ferrule design is preferred.

A tunable FFP of this invention generally comprises a PZT bonded between two ferrule holders with each ferrule holder generally providing a passageway for receiving a ferrule and means for securing the ferrules therein in relative alignment. A ferrule assembly having an optical cavity is formed in the FFP on insertion and alignment of the ferrules in the holders. The PZT and the ferrule holders are bonded to each other such that application of a voltage to the PZT changes the optical cavity length of the ferrule assembly. The ferrules are secured in their holders such that the optical cavity can be varied without significant loss of alignment.

An important feature of the ferrule holders of this invention and FFPs comprising them is that the fibers in the ferrule assembly can be aligned using an incremental rotary alignment technique, such as that used in alignment of rotary mechanical splice fixtures. The inventive holders have a unitary body with a ferrule passageway shaped to include three substantially flat regions so that the ferrule can be secured therein at three points of contact around the circumference of the ferrule. The shaping of the passageway to achieve this three-point contact is illustrated in the radial cross-sections of FIGS. 2–6. The holder also has a means for securing the ferrule in the passageway to establish three-point contact. This securing means applies a force to the ferrule at one of the three flats of the passageway urging the ferrule to contact the remaining two flats and establishing a three-point contact along the length of the holder passageway.

Figure 2:
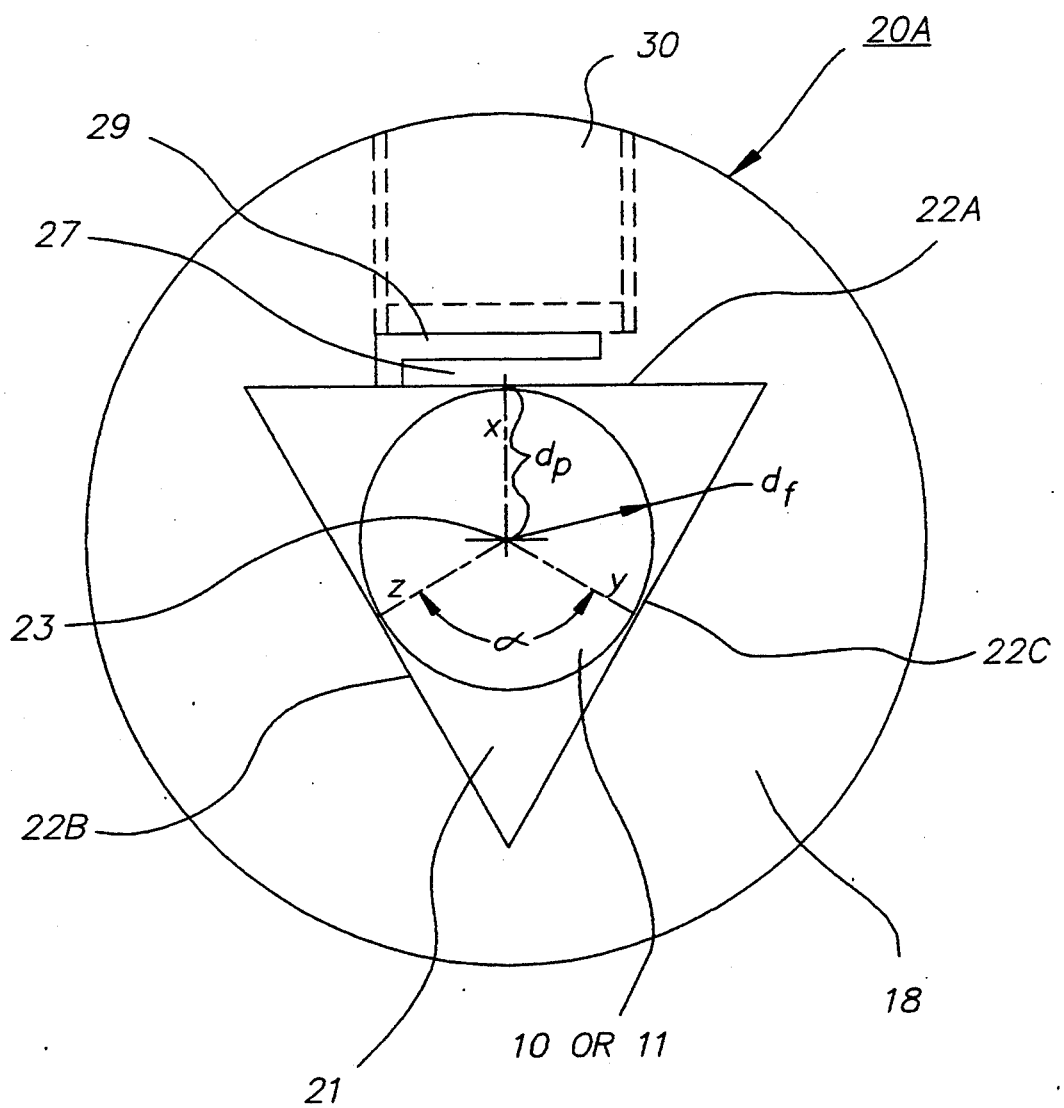
FIG. 2 is a cross-sectional view of an exemplary ferrule holder of this invention. This view provides an example of a triangular shaped passageway for three-point contact.

FIG. 2 illustrates the use of a triangularly shaped passageway (21) to achieve three-point ferrule contact. This figure shows a ferrule (10 or 11) positioned within a ferrule holder 20A. The passageway 21 is shaped substantially as an equilateral triangle and is centered in the cylindrical holder. In this illustration the longitudinal axis of the passageway 23 coincides with that of the holder 19. The passageway is smooth and sized with respect to the diameter of the ferrule to receive the cylindrical ferrule without binding and such that the ferrule can contact each side of the triangle. The contact points between the ferrule and the passageway, 22A, 22B and 22C, are preferable distributed equiangularly around the circumference of the ferrule with $\alpha=$ about 120°. The passageway is preferably sized with respect to the ferrule diameter such that the radii of the ferrule cylinder (x, y and z) extending to the contact points are substantially perpendicular to the passageway surface at the contact point.

The ferrule holder has a means for retaining the ferrule in the passageway which comprises a resilient arm 27 extending from the body of the holder intermediate between the bottom of tapped holes 30 and one side of the passageway. The resilient arm 27 is formed by extending a slot 29 outward from the holder passageway 21 under the bottom of the tapped holes. Flat contact 22A is on the inner side (toward the passageway) of this resilient arm. For convenience of machining the body, slot 29 which creates arm 27 can extend the entire longitudinal length of the holder body. Alternatively, a resilient arm can be positioned between the bottom of each screw hole along the length of the passageway. Three-point contact between the ferrule and the passageway along the length of the ferrule is secured by tightening a screw, preferably a cupped screw, into a tapped hole 30. The end of the screw contacts the outer side of the resilient arm 27, displacing it downwardly to contact the ferrule in the passageway. As a result of the downward force applied through the screw the ferrule also contacts the passageway at 22B and 22C.

Figure 3:
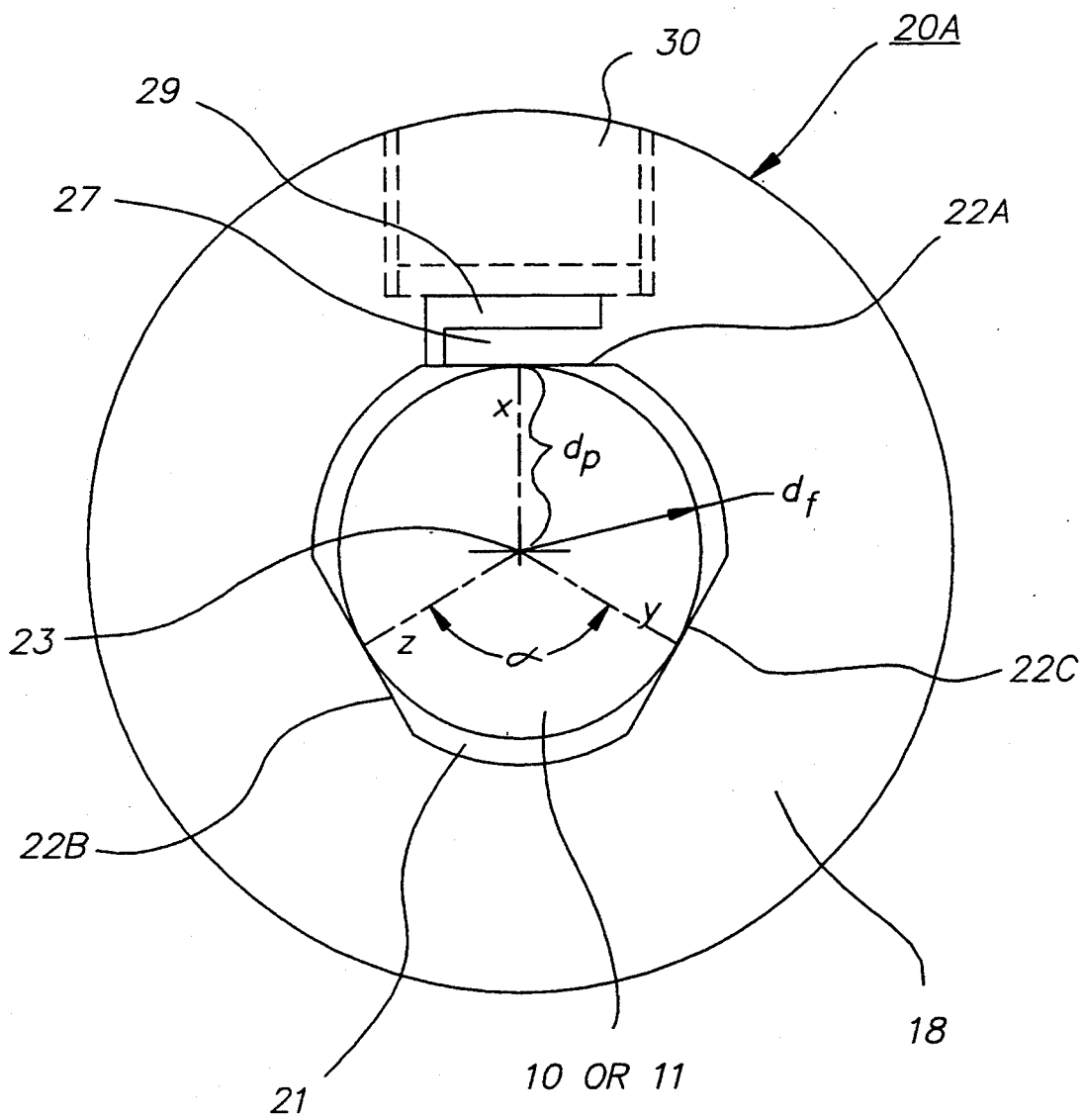
FIG. 3 is a cross-sectional view of a second exemplary ferrule holder with shaped passageway of this invention.
Figure 4:
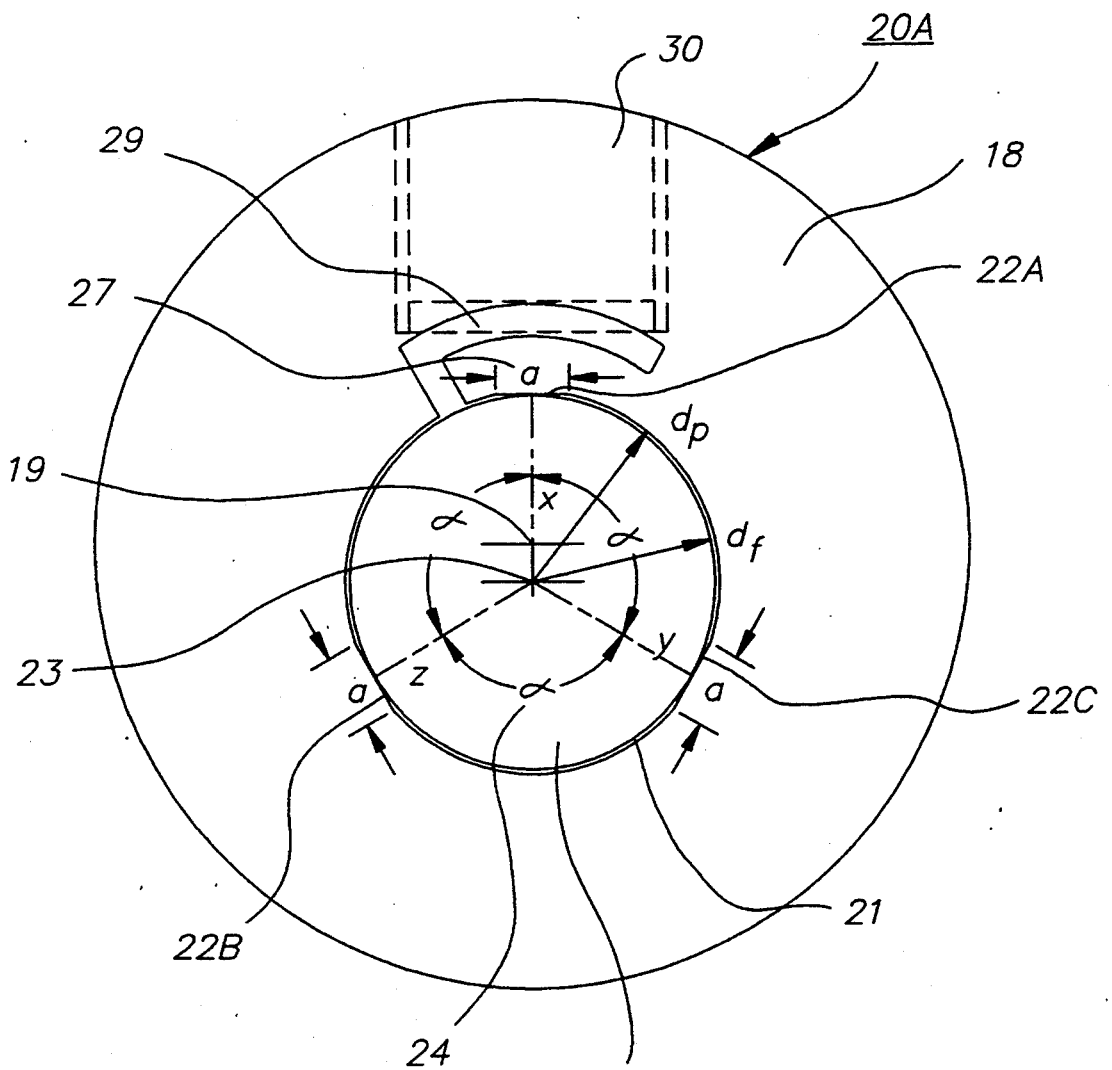
FIG. 4 is a cross-sectional view of a third exemplary ferrule holder with shaped passageway of this invention.

FIGS. 3 and 4 illustrate different passageway shapes which allow three-point contact with the ferrule. The passageway of FIG. 3 is partially cylindrical with three flat regions equiangularly arrayed around the passageway Each flat extends the length of the passageway. The angle $\alpha$ is preferably about 120°. As in FIG. 2, the radii of the cylinder (x, y and z) extending to the contact points are preferably substantially perpendicular to the passageway surface at the contact point.

FIG. 4 illustrates a preferred passageway that is substantially cylindrical having flats, shorter than those illustrated in FIG. 3, for contacting the ferrule. This design is preferred for stability of alignment. The flats of width (a) are preferably equiangularly and symmetrical arrayed around the passageway. The angle $\alpha$ is preferably about 120°. The diameter of the passageway, $d_p$, is slightly larger than that of the ferrule, $d_f$, so that the ferrule can be inserted into the passageway without binding. Preferably the width a is selected such that $$a \geq 2\sqrt{d_p^2 - d_f^2}.$$

The corners of the triangular passageway of FIG. 2 are shown to form sharp points. As is readily apparent on scrutiny of the exemplified passageway shapes, these corners may be blunted or rounded without affecting three-point contact in the passageway. It will be appreciated by those of ordinary skill in the art that many variations of shaped passageways can be employed to achieve the desired three-point contact with the ferrule. It will also be readily apparent that the passageways can be shaped such that an inserted ferrule will make more than three contacts at flats therein. Such multi-point contact schemes which incorporate a basic three-point contact scheme are within the scope of the present invention, but are not preferred.

Figure 5:
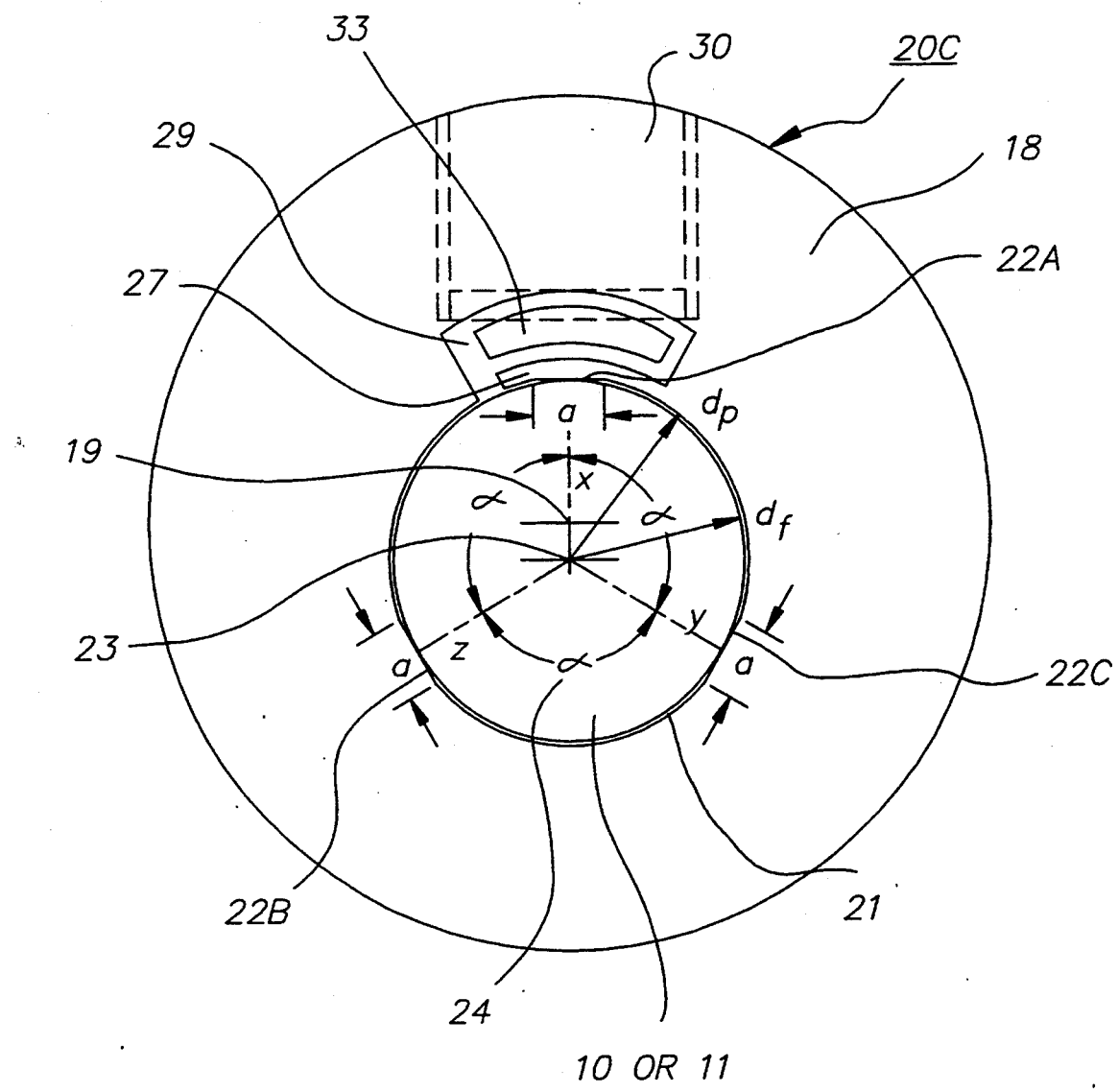
FIG. 5 is a cross-sectional view of yet another ferrule holder of this invention. This ferrule holder has a retention means having a resilient arm and an element separate from the holder body.

FIG. 5 illustrates a ferrule holder having essentially the same passageway design of FIG. 4 but having an alternate ferrule retention means. A channel 31 is introduced in the holder adjacent to the ferrule passageway for receiving a separate element 33 which is retained in the channel. The channel is positioned under the tapped holes 30 such that a screw tightened into the hold will contact the element 33 in the channel displacing it downwardly. The channel element 33 in turn contacts the resilient arm 27 and displaces it downwardly to contact the ferrule in the passageway. The application of a radial force, by means of the screw and mediated through the channel element 33 and the resilient arm 27 secures the ferrule in a three-point contact within the passageway.

The channel element can be constructed of the same material as the holder and arm. Alternatively, as will be discussed below the material of the channel element can be selected to have a thermal expansion coefficient to compensate for any mismatch between the thermal expansion coefficients of the ferrules and the holder body. Further, the channel element in combination with the means for securing the ferrules within the holder can provide a means for selectively adjusting the thermal expansion coefficient of the holder FFPs comprising the holder after the FFPs have been constructed. For such an application the channel element should be made of a material, such as a high-expansion metal having thermal expansion coefficient higher, i.e. more positive, than that of the body of the ferrule holder.

For convenience of machining, channel 33 and the channel element therein are shown to extend the length of the ferrule holder. Alternatively, a channel and channel element can be positioned under each tapped hole along the length of the ferrule. The adjustable thermal coefficient feature requires the channel and channel element to extend the length of the ferrule.

Figure 6:
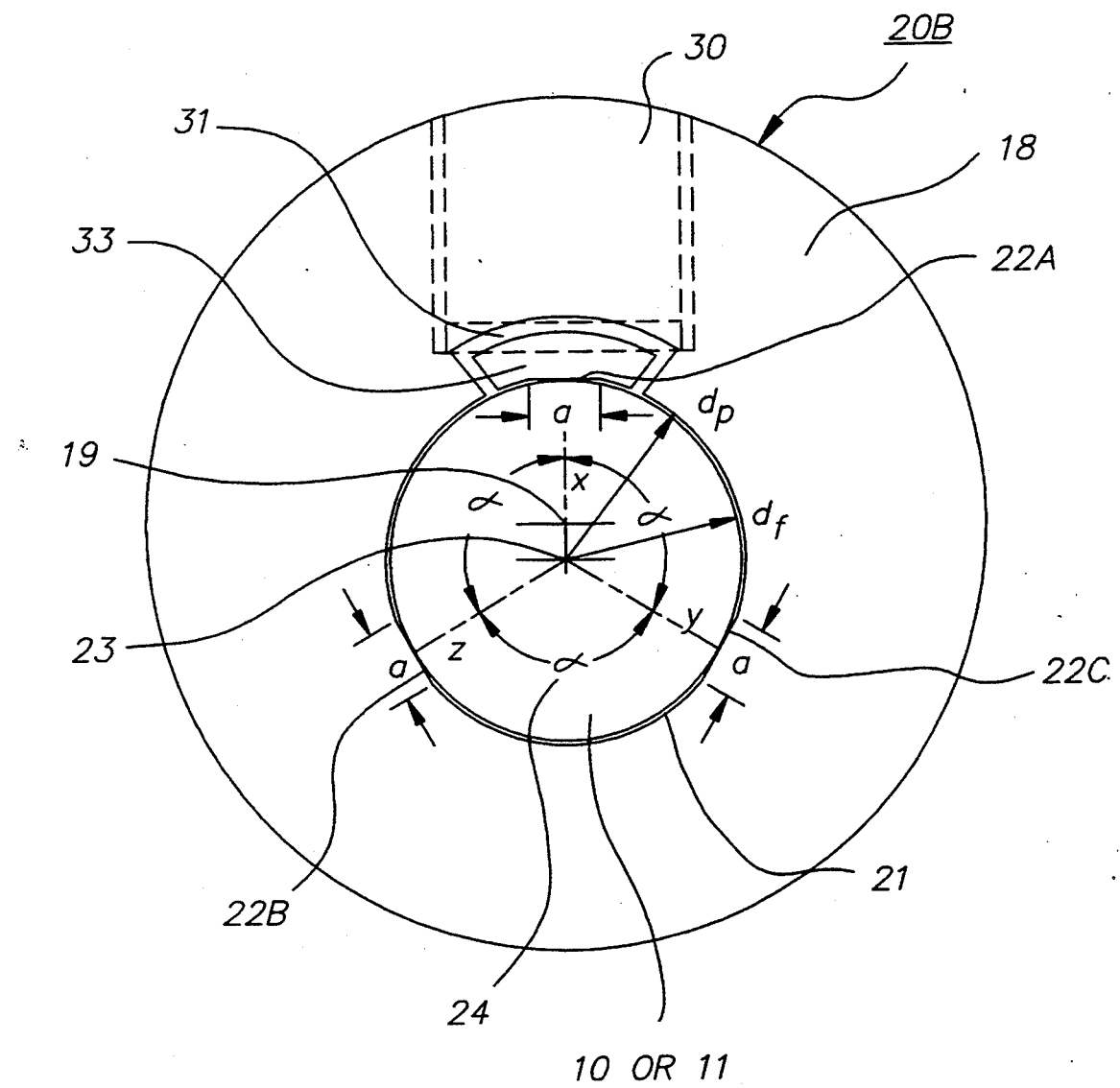
FIG. 6 is a cross-sectional view of another ferrule holder of this invention. This ferrule holder has a ferrule retention means which is an element separate from the holder body.

FIG. 6 illustrates a ferrule holder having essentially the same passageway design of FIG. 4 but having another alternate ferrule retention means, a separate element 31, positioned intermediate between the bottom of the tapped holes 30 and the ferrule in the passageway. Element 31 is separate from the body of the ferrule holder positioned and held within retaining channel 33 on the holder. Element 31 can be made of the same or different material than the body of the holder. This channel and element are sized and shaped with respect to each other such that the element is held within the channel but can be displaced downwardly by applying a radial force, such as by tightening a screw into the tapped hole. On displacement the element contacts the ferrule in the passageway urging it downward to establish contact with flats 22B and 22C. The inner side of the ferrule retention element 31 contains flat portion 22A which forms a flat surface of the passageway. Again for convenience of machining, channel 33 and the ferrule retention element 31 therein extend the length of the ferrule holder. Alternatively, a channel and ferrule retention element can be positioned under each tapped hole along the length of the ferrule.

The channel and ferrule retention element of FIG. 6 can be combined with the ferrule securing means to provide for selective adjustment of the longitudinal thermal expansion coefficient of the holder and any FFP constructed therefrom. This adjustment feature requires that the element be made of a material having a thermal expansion coefficient higher than that of the holder body, i.e. more positive. This feature also requires that the channel and element extend the length of the ferrule. This feature allows selective adjustment of the thermal expansion coefficient of an FFP after it has been constructed.

In FIGS. 4–6 the longitudinal axis of the passageway 23 is offset from the axis of the holder 19. Offsetting the passageway axis provides more room for tapping screw holes 30 and creation of arm 27 or channel 33. Designs having this offset are more compact and are preferred for construction of miniaturized FFPs.

Figure 7:
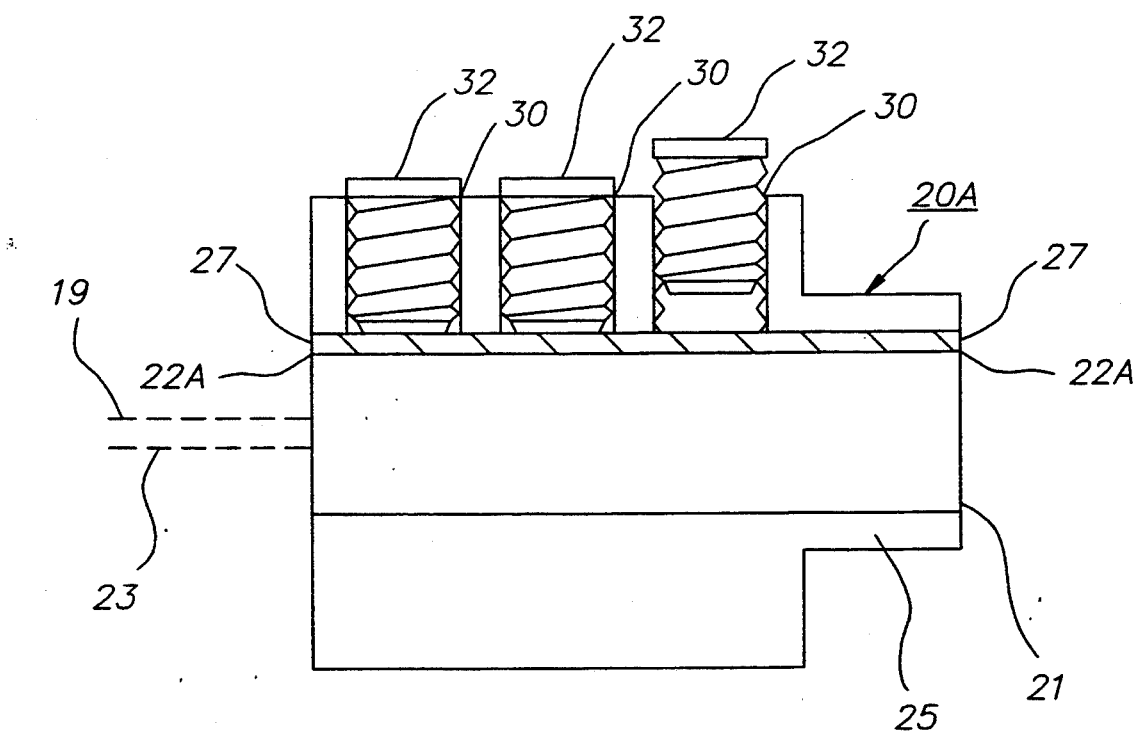
FIG. 7 is a longitudinal cross-sectional view of an exemplary ferrule holder of this invention.

FIG. 7 is a longitudinal cross-section of a ferrule holder of this invention. Passageway 21 extends the length of the holder and the means for securing a ferrule in the holder is a plurality of tapped holes 30 with screws 32, three screws are shown, in a line along the length of the holder. The ferrule retention means comprising an arm 27 formed by slot 29 are shown. The screws 32 is shown with cupped heads which are preferred. The cross-section is shown for the ferrule holder of FIG. 4. However, cross-sections of exemplary holders of all of FIGS. 4–6 are analogous to FIG. 7.

Figure 8:
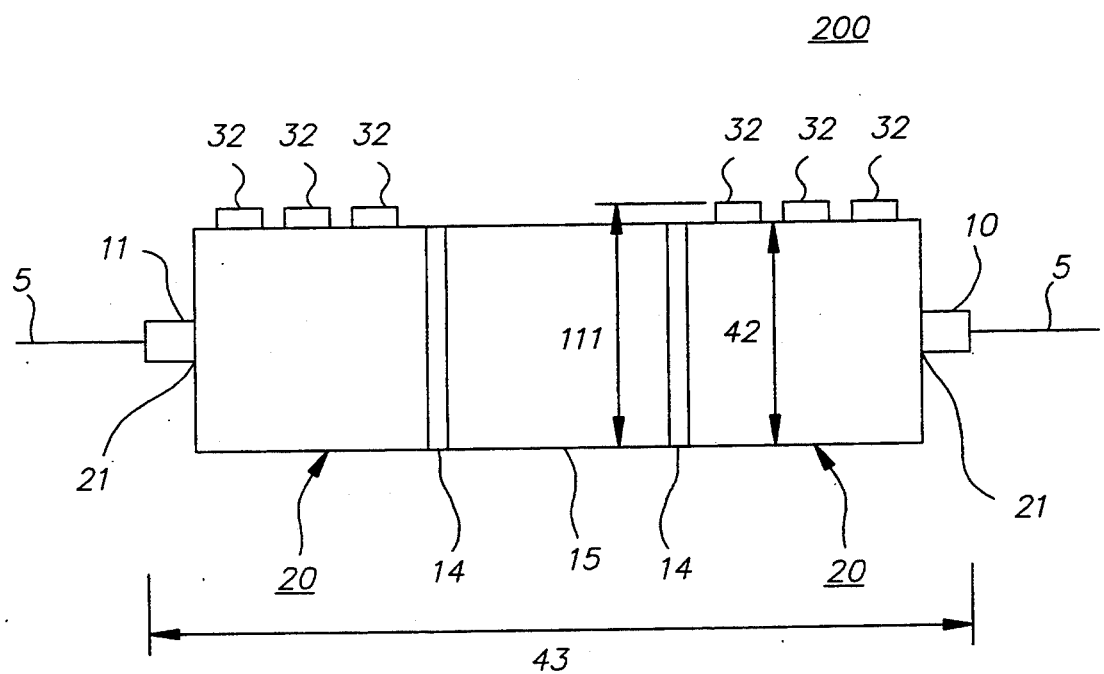
FIG. 8 is a view of an FFP of this invention.

FIG. 7 also illustrates a means for receiving a PZT, flange 25, at the internal longitudinal end of the holder around the circumference of the internal exit of the holder passageway. This flange is designed to fit inside the passageway of the PZT to keep adhesive out of the optical cavity. The outer diameter of the flange is thus sized to receive a cylindrical PZT. The flange is inserted into the cylindrical passageway along the axis of the PZT. Cylindrical PZTs elongate along this longitudinal axis. An FFP alignment fixture of this invention is constructed by bonding, preferably with controlled-thickness epoxy bonds, 14, a ferrule holder 20, via its internal end, to either side of a cylindrical PZT 15, as schematically shown in FIG. 8. Adhesive thickness (14) is controlled by the use of gauge wires as described in detail below.

Note that in FIG. 8 the height of the PZT, i.e. its diameter to the top of the screw heads is indicated, 41. In miniaturized FFPs the height is about 6.8 mm or less. Using the FFP designs herein, miniaturized FFPs having dimensions of less than or equal to about 6.8 mm in height (41), 10 mm in width (42) and 30 mm in length (43) have been constructed.

Figure 9:
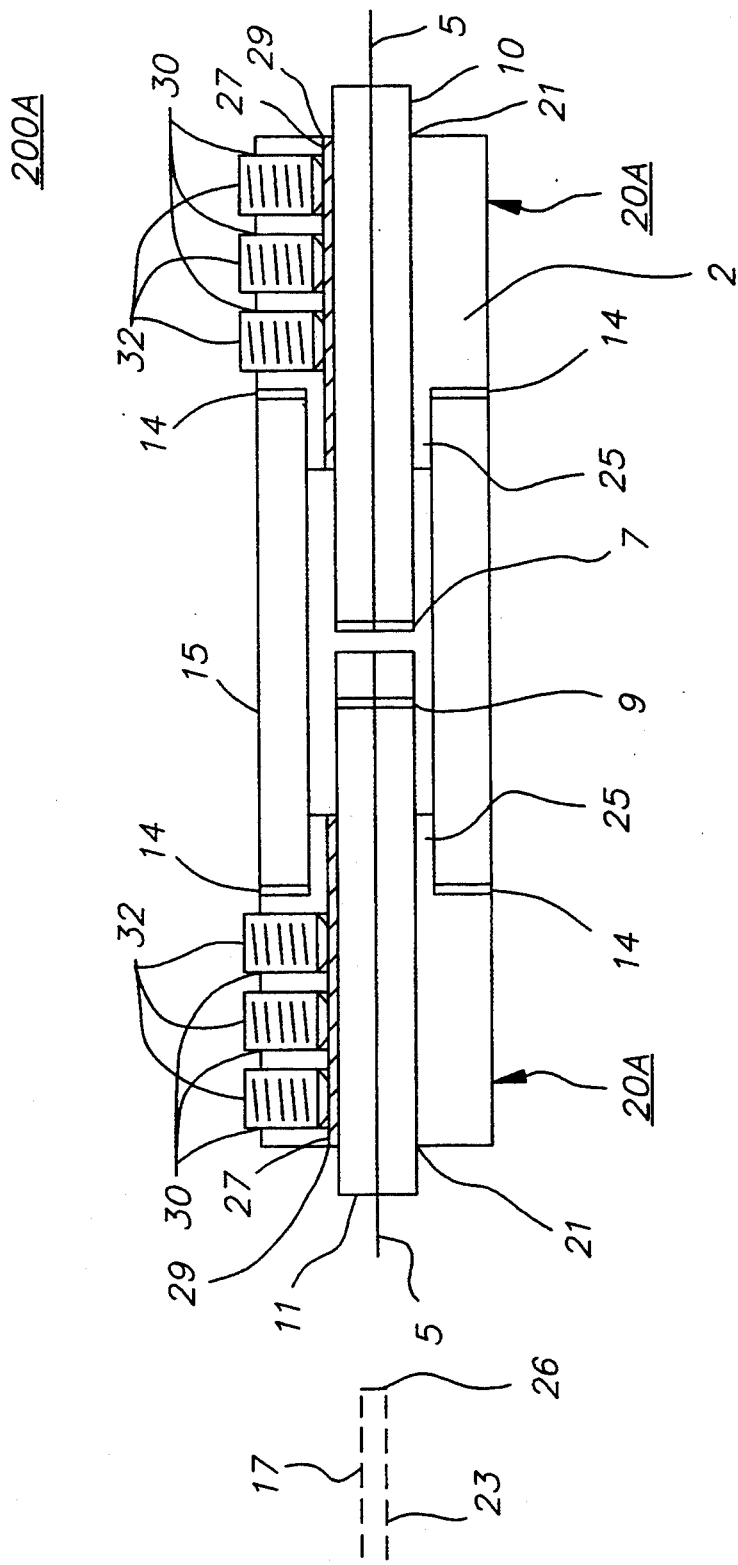
FIG. 9 is a longitudinal cross-sectional view of an FFP of this invention with ferrule assembly in place.

FIG. 9 illustrates a longitudinal cross-section of an FFP of this invention with a ferrule assembly, ferrules 10 and 11, in place forming an optical cavity between mirrors 9 and 7. As indicated in the figure, the internal ends of the ferrules extend into the passageway of the PZT 15. Application of a voltage to the PZT elongates the PZT and as a result increases the optical cavity length of the FFP. Variation of the optical cavity length is used to tune the wavelength of the filter.

The term fiber alignment is used herein to refer to alignment of optical fibers through the ferrule assembly of the FFP. Fibers are aligned to maximize optical signal through the filter. To achieve a low-loss filter, high precision, close tolerance alignment of the optical fibers is necessary. The rotary alignment method which has been described in U.S. Pat. No. 4,545,644 for active alignment of fibers in optical fiber splice provides high-precision alignment needed for low-loss filters. The method as described therein, which is incorporated by reference herein, is applied to align the fibers of the FFPs of this invention. Briefly, the method involves stepwise rotation of the ferrules in the fixture relative to each other and the fixture to achieve maximum overlap of the fibers as measured by maximum signal (or minimum scattering) through the filter. As applied to the inventive FFPs, the ferrules are inserted into the ferrule holders and partially secured therein to provide some resistance to rotation. Optical signal through the filter is monitored while one ferrule is rotated in the holder until a maximum signal is obtained. The other ferrule is then rotated in the holder until a second maximum is obtained. The first ferrule is then rotated to achieve a third maximum. This stepwise process is continued until no further signal improvement is observed. After the desired alignment is obtained the ferrules are tightly secured within the holders. The three-point contact that is obtained in the holders of this invention provides more stable alignment compared to methods in which set screws are use to adjust the position of the ferrule within the holder. The three-point contact essentially secures the ferrules in a V-groove substantially preventing rotation of the ferrules in the holder and thus preserving fiber alignment.

Furthermore, this means of alignment and of securing the ferrules in alignment in the FFP retains high precision alignment but allows longitudinal variation in the cavity length so that the filter can be tuned.

The rotary alignment technique as described in U.S. Pat. No. 4,545,644 requires an alignment fixture offset. This feature increases the offset between the fiber axes of the two ferrules in the fixture. This feature is introduced in the rotary mechanical splice ferrule alignment fixtures to facilitate rotary alignment of ferrules. It has been found empirically in the PZT-tuned FFPs of this invention that there is no need to incorporate such a fixture offset to increase the offset between fiber axes in the FFP. Typically, there is sufficient fiber axis offset resulting from ferrule mismatch, variations in individually machined parts and variations resulting from bonding the holders to the PZT to allow the rotary alignment technique to be use. In the rare event that the fiber axes offset is not sufficient in an FFP, simply substituting one of the ferrules for another will generate the required offset.

In principal, the ferrule holders of this invention can be fabricated from any material that will provide a durable rigid support for the ferrules. Various metals, such as stainless steel, can be employed. In general, the passageways in the ferrule holders of this invention are shaped by any high precision machining techniques appropriate for the material chosen. Low-expansion alloys can be difficult to machine, however, electron discharge machining techniques as are well-known in the art can be employed to introduce the desired shaped passageways, channels and slots in the inventive holders.

However, for many applications FFPs must be temperature compensated to minimize the undesired effect of ambient temperature changes on cavity length. In addition, temperature compensation minimizes the effect of ambient temperature changes on insertional loss, due to variation of alignment of fibers with temperature. Detriment to alignment is minimized in the FFPs of this invention if the force on the ferrule within the holder remains substantially constant.

In the PZT-tuned FFPs of this invention temperature compensation is achieved in part by the use of controlled thickness of positive thermal coefficient adhesive, such as epoxy, in the bonds between the holders and the PZT, as will be described below. Insertional loss, i.e. loss of alignment, with temperature is minimized in the inventive FFPs by choice of materials for the holder and its component parts. The ferrule holders are most preferably entirely fabricated from a material which has a thermal expansion coefficient equal to that of the material from which the ferrules are constructed.

Fiber ferrules are typically made from low-expansion glass like, Pyrex TM. Quartz, other glasses and ceramics can also be used to fabricate fiber ferrules.

Low-expansion metal alloys, i.e. those having a thermal expansion coefficient of about 7.5 ppm/°C. or less are suitable materials for preparation of ferrule holders of this invention. Particularly suitable low-expansion alloys are those containing nickel and iron, such as Invar TM, ternary alloys of nickel, iron and cobalt, such as Kovar TM, or ternary alloys of iron, cobalt and chromium, such as Elinvar TM, all as described in M. A. Hunter (1961) Metals Handbook, American Society of Metals 8th Ed. (Taylor Lyman, ed.) Volume 1, p.816–819.

For example, a low-expansion alloy having a thermal expansion coefficient of about 3.6 ppm/°C. (the thermal expansion coefficient of Pyrex TM) would be most preferred for use with Pyrex TM ferrules. This is true, however, only if the entire holder including the screws can be fabricated from such a low-expansion alloy. These alloys are, however, difficult to machine. It is therefore difficult and expensive to prepare screws from many low-expansion alloys. Further, while it is possible to make an alloy with a desired low thermal expansion coefficient by variation of its component elements as described in Hunter (1961), supra, it is more efficient and less expensive to employ commercially available alloys, like Kovar TM or Invar TM.

It has been found empirically that a temperature compensated PZT-tuned FFP for Pyrex TM can be made using a ferrule holder of this invention fabricated with Kovar TM and having low-expansion stainless screws. The ferrule retention means was provided as a resilient Kovar TM arm extending from the holder body. The mismatch between the thermal expansion coefficient of Kovar TM (about 5 ppm/°C.) and Pyrex TM (3.6 ppm/°C.) was compensated by use of screws of higher thermal coefficient material (stainless steel of about 10 ppm/°C.). If an alloy of slightly lower expansion coefficient were employed for a holder for Pyrex TM ferrules, the desired balance would be obtained by using screws having a slightly lower expansion coefficient than stainless steel.

Such general principles can be used to select appropriate materials for ferrule holders and components to achieve temperature compensation. The temperature compensation achieved by any particular selection of materials for holders and screws can be readily tested. A test filter is fabricated from materials selected according to the general principles discussed above. The ferrules are secured in the holder at room temperature and the force required to rotate a ferrule is measured. In the most preferred temperature compensated FFPs, the force required to rotate the ferrule will remain substantially constant as the temperature is changes. Preferred temperature compensated FFPS are those in which the change in the force required to rotate the ferrule is minimized as a function of temperature.

In general, satisfactory temperature compensation of FFPs can be achieved if the ferrule holder body is fabricated of material having a thermal expansion coefficient within a factor of two higher or lower than that of the ferrule material. Over this range choices of materials for the ferrule retention element and or screws can be made to satisfactorily compensate for mismatches in thermal expansion coefficients of the body and the ferrules. Preferred ferrule materials for temperature compensated FFPs are those which have a thermal expansion coefficient that differs from that of the ferrule material by less than about 50%, e.g. for Pyrex TM ferrule holders made of materials having a thermal expansion coefficient between about 5.4 and 1.8 ppm/°C. are preferred.

In U.S. patent application Ser. No. 07/929,839 now allowed ferrule holders and FFP having an adjustable means for selectively changing the longitudinal thermal expansion coefficient of the filter are described. This feature can be adapted to the FFPs of this invention in which the ferrule holder body is made of a material having a thermal expansion coefficient different from that of the ferrules. The channel or ferrule retention element material can be selected to compensate for the mismatch. The channel or ferrule retention element will extend the entire length of the ferrule under the plurality of adjustable screws. Temperature compensation is then adjustable as described in U.S. patent application Ser. No. 07/929,839 by changing the points of contact with the holder body along the length of the ferrule.

In general, any means for selectively applying a radial force to the ferrule retention means can be employed. Screws provide a simple practical means for applying such a force. Screws employed in the FFPs of this invention are preferably sealed with a silicon thread sealer to keep moisture out of the FFP. Screws employed may be made of the same material as the holder. Since low-expansion metal alloys are difficult to machine it is impractical to employ screws made of these alloys. As noted above, screws fabricated from other metals dependent on the type of ferrule employed are used with low-expansion alloy holders. Screws with cupped-ends which tightly grip the surface against which they are tightened are preferable.

Certain FFPs of this invention employ a piezoelectric transducer means which transforms electrical energy into mechanical energy by utilizing the piezoelectric longitudinal effect. PZTs elongate along one axis on application of an electric field and the elongation is proportional to the applied field. Electrostrictive materials which elongate on application of a field, but in which the elongation is proportional to the square of the applied field can also be employed in the FFPs of this invention to vary optical cavity length. Like PZTs, electrostrictive materials will display negative temperature coefficients, the effect of which can be compensated as described herein specifically for PZTs.

Filters are constructed by first determining the amount of positive temperature coefficient adhesive required to balance the negative temperature coefficient of the PZT. This is done in a test filter as described in U.S. patent application Ser. No. 07/929,836, now allowed. The thickness of the adhesive layers between the ends of the PZT and the internal ends of each ferrule holder is controlled using gauge wires, for example. Epoxy layers were controlled by use of steel gauge wire spacers of precise known diameter inserted between the surfaces to be bonded. The thickness of the epoxy layer required for a particular FFP design, i.e., fixture design, type of ferrules used, the size of PZTs and other materials used in the filter. The thickness of the epoxy layers used to bond the PZTs to the support brackets in a test FFP is varied until wavelength drift as a function of temperature is minimized. Preferably, epoxy thicknesses are adjusted in the test filter so that the wavelength drift of the filter is equal to or less than 0.1 FSR/15° C. FFPs of the same design as the test FFP are then constructed using the experimentally determined epoxy thicknesses which gave a minimum temperature drift in the test FFP.

Ferrule holders can be made of various metals and have typically been made of stainless steel. Note that different types of stainless steel have different thermal expansion coefficients. For general purposes low-expansion coefficient (10.3 ppm/°C.) stainless steel is preferred. Ferrules are typically fabricated from Pyrex TM, but may also be made of other types of glass or quartz which all have relatively low positive temperature coefficients. In certain temperature compensated FFPs of this invention, the ferrule holders are fabricated from low-expansion metal alloys, i.e. those having thermal expansion coefficients less than about 7.5 ppm/°C., dependent upon the type of ferrule material used. The amount of epoxy required to balance the temperature coefficient of a filter will be sensitive to low temperature coefficient materials present in large amounts in the support and fixture or even small amounts of high temperature coefficient materials used in the support and fixture. The thickness of the epoxy joints in the FFP must also be such that the PZT is substantially rigidly bonded between the ferrule holders.

Non-deformable (i.e., steel) wires of very precise gauge can be employed to control epoxy thickness. Such steel gauge wires are commercially available. To control epoxy thickness, a gauge wire is inserted between the end of the PZT and the bracket to which it is to be bonded. A drop of epoxy is applied in the joint sufficient to cover the entire area of the joint. The area of the joint typically corresponds to the area of the end of the PZT. Uniform pressure is applied across the joint and excess epoxy which is squeezed out of the joint on application of a uniform pressure is removed. A uniform controlled thickness of epoxy results after curing of the epoxy. It has been found that non-deformable steel gauge wires are suitable non-deformable spacers for forming the desired controlled thickness epoxy layers. It is not necessarily the case that the thicknesses of the epoxy layers is equal to the diameter of the gauge wire. However, the use of the same gauge of wire will give reproducibly controlled thicknesses of epoxy in FFP joints. This method employing experimentally selected steel gauge wires and the application of uniform manual force was found to result in FFPs with substantially reproducible low temperature coefficients. Consistency in manufacture may be further improved by application of uniform mechanical force across the joints, such as by the application of adjustable clamps or like devices.

It was found that the FFPs of this invention were conveniently constructed by inserting a straight smooth rod of ferrule material through the passageways of the component ferrule holders and PZT, aligning the components along that rod, and bonding the components together with the rod in place. Bonding is accomplished by inserting gauge wires, applying epoxy for both bonds and clamping the filter components together. This method has been found to give excellent reproducibility. The reproducibility of a method for construction a temperature compensated FFP can be assessed by determining an average temperature coefficient of a number of FFPs prepared employing that method.

This method of constructing an FFP can be adapted to introduce an alignment fixture offset as a design feature in the FFP. Such a fixture offset was described in U.S. Pat. No. 4,545,644 to facilitate rotary alignment of ferrules. In the FFPs of this invention, an alignment fixture offset can be optionally introduced by creating a flat portion on the glass rod employed to align the FFP components for bonding.

The type of epoxy used is selected such that a layer that is thick enough to balance the negative temperature coefficient of the PZTs is thick enough to provide a good bond.

In general, any means for obtaining a controlled thickness of adhesive (or a controlled amount of adhesive) in a joint can be employed in the construction of temperature compensated filters of this invention. For example, the face of the holder to which the PZT will be bonded can be provided with a precisely machined groove for receiving and positioning the PZT. In addition, one or more spacing ridges can be precisely machined on the face of the support bracket to serve as a non-deformable spacer for generating an epoxy joint of uniform thickness.

The FFPs of this invention, particularly those that are temperature compensated can be employed in combination with wavelocking circuitry as is know in the art.

The temperature compensated FFPs described herein were constructed at normal room temperatures. The empirical balancing of temperature coefficients of the filters described herein was assessed within the expected normal operational temperatures ($-25°$ C.$-+85°$ C.) of the filter. Temperature drift is typically assessed by cooling and/or heating the test FFP above room temperature.

Temperature compensated FFPs of this invention having a holder like that of FIG. 4, having Pyrex TM ferrules, Kovar TM holder bodies and employing low-expansion (10.3 ppm/°C.) stainless steel screws display wavelength drift of less than about 1 FSR/100° C. in the range $-20°$ to $+85°$ C. These FFPs also display insertional loss after multiple temperature cycles of the same temperature range of less than 1 Db. Further, these FFPs require locking voltages of magnitude less than about $+/-5$ volts to maintain a desired wavelength over the entire temperature range tested. Standard wavelength locking techniques were employed.

The terms "precision", "precisely controlled" and "to high tolerance" as employed herein as used in reference to alignment fixtures, spacers machining and refer to machining to a minimum precision of about 0.0001 inch (1/10 mil).

The term optical as used in "optical fiber", "optical cavity" or "optical transmission", herein refers to electromagnetic radiation having a wavelength such that the radiation can be transmitted by means of dielectric fibers with loss less than 25 db/Km. Presently, wavelengths in the range of 400 to 2,000 nm can be transmitted by optical fibers. The term "optically continuous" refers to optical fibers through which an optical signal can be transmitted. An optically continuous fiber may contain fiber ends or small fiber gaps so long as an optical signal can traverse the fiber. While FFPs have typically been employed for communications applications, with appropriate choice of materials FFPs can be employed for filtering of wavelengths other than those used in communication.

The PZTs employed in the PZT-tunable FFPs of this invention have a cylindrical passageway extending along this elongation axis. The optical cavity of the FFP is formed within the passageway of the PZT between the mirrors of two ferrules inserted therein. The use of such PZTs minimizes the height and width of the FFP and greatly facilitates its use in confined spaces such as on circuit boards. With commercially available PZTs, and ferrule material, FFPs of this invention suitable for circuit board use can be constructed that are about 6.8 mm high, about 10 mm wide and about 30 mm long.

The FFPs of this invention can be employed in any device applications known in the art for prior art FFPs. When necessary these FFPs can be mounted into devices using conventional art-known techniques of mechanical isolation to allow expansion of the cavity length and wavelength tuning. Miniaturized FFPs can be mounted onto circuit boards for example in foam holders, such as neoprene holders, which mechanically isolate the FFP from its surroundings, yet allow desired longitudinal expansion of the PZT and exert no forces which might disrupt alignment of the optical fibers of the FFP. The foam holder comprises a cavity sized to fit, hold and thereby mechanically isolate the FFP. The foam holder containing the FFP is mounted on the circuit board and the PZT leads can then be soldered to the circuit board connections. Miniaturized FFPs are useful in any application where the size of a device is a concern. Miniaturized FFPS are particularly attractive for applications which require the use of multiple FFPs, for example in multi-channel selection, to minimize device size.

The FFPs of this invention are tunable by application of an electric field to a PZT. A tunable FFP is a filter in which the wavelength or frequency of the transmission output of the filter is changed, shifted or tuned by changing the optical path length of the resonance cavity of the FFP. In contrast a fixed FFP is intended to transmit a fixed wavelength (or frequency) and to be operated at a substantially constant optical cavity length between the mirrors. In some fixed FFP applications, it may be desirable that the FFP be capable of small cavity length changes, for example to adjust to small source fluctuations. A filter that is tunable over a small range, e.g., less than 30% of an FSR is a narrowly tunable or trimable FFP. FFPs of this invention can be employed in applications requiring either tunable or trimable fixed FFPs.

Fixed cavity length FFPs can be tuned by changing the temperature of the filter or by changing refractive index. The ferrule holders of this invention can be employed in fixed cavity length FFP as well as variable cavity length FFPs.

As will be appreciated by those in the art, chromatic dispersion, waveguide dispersion, inaccuracies in spectrum analysis, and errors in measurement can add to the measured variation in FSR as a function of wavelength. Methods for the minimization of such dispersion effects and inaccuracies are well-known in the art. It is also well-known in the art that the wavelength range over which a FFP is operable (operable wavelength range) is limited by the wavelength dependence of the mirrors employed.

One of ordinary skill in the art will appreciate that the configurations, materials and techniques specifically described and exemplified herein can be modified, altered or adapted to achieve the objectives of this invention. All such alterations and modifications that embody the principles of this invention are encompassed within the spirit and scope of this invention.

We claim:

1. A fiber ferrule holder for a fiber Fabry-Perot filter which comprises:
    a unitary body having a passageway extending the longitudinal length of the body for receiving said ferrule, which passageway is shaped along its longitudinal length to provide flats for three-point contact along the length of said ferrule; and
    means for securing said ferrule in said holder to establish said three-point contact
    wherein said body is fabricated from a low-expansion metal alloy having a thermal expansion coefficient that is within about a factor of two higher or lower than that of the ferrule material.

2. A fiber ferrule holder for a fiber Fabry-Perot filter which comprises:
    a unitary body having a passageway extending the longitudinal length of the body for receiving said ferrule, which passageway is shaped along its length to provide flats for three-point contact between said ferrule and said holder body;
    means for securing said ferrule in said holder positioned along the length of said passageway to establish said three-point contact; and
    means at one longitudinal end of said holder for receiving and bonding to a piezoelectric transducer.

3. The ferrule holder of claim 2 wherein said body is fabricated from a low-expansion metal alloy having a thermal expansion coefficient that is within about a factor of two higher or lower than that of the ferrule material.

4. The ferrule holder of claim 2 wherein said means for securing said ferrule in said shaped passageway to establish three-point contact comprises:
    a plurality of tapped holes for receiving screws positioned in a line along the longitudinal length of the holder which extend inward from the surface of the body toward said passageway; screws in each of said tapped holes and
    ferrule retention means intermediate between the bottom of each of said tapped holes and said passageway and positioned such that tightening a screw into a tapped hole displaces said ferrule retention means such that it contacts and thereby secures said ferrule in the passage.

5. The ferrule holder of claim 3 wherein the body is fabricated from a material having a thermal expansion coefficient that is within a factor of two higher or lower than that of the ferrule material.

6. The ferrule holder of claim 3 wherein said ferrule retention means comprises an element separate from said body but positioned and retained within said body intermediate between said tapped holes and a ferrule in said passageway said ferrule retention element forming a portion of said shaped passageway and providing a flat in said passageway such that a screw tightened into a tapped hole downwardly displaces said arm to contact and secure said ferrule at said flat in said shaped passageway thereby establishing said three-point contact.

7. The ferrule holder of claim 3 wherein said ferrule retention means comprises a resilient arm intermediate between said tapped holes and a ferrule in said passageway which extends from the holder body under each of said tapped holes, which forms a portion of said shaped passageway and provides a flat in said shaped passageway such that a screw tightened into a tapped hole downwardly displaces said arm to contact and secure said ferrule in said shaped passageway thereby forming said three-point contact.

8. The ferrule holder of claim 7 wherein said passageway is triangular having three substantially flat surfaces along its length for contacting said ferrule and wherein said line of tapped screw holes is positioned above one of said flat surfaces of the passageway.

9. The ferrule holder of claim 3 wherein said passageway is generally cylindrical but has three substantially flat surfaces along its longitudinal length positioned equiangularly around the circumference of said passageway for contacting said ferrule and wherein said line of tapped screw holes is positioned above one of said flat surfaces within the passageway.

10. The ferrule holder of claim 9 for use with Pyrex TM ferrules wherein said body is fabricated from a low-expansion metal alloy having a thermal expansion coefficient at room temperature of between about 5.4 and about 1.8 ppm/°C.

11. The ferrule holder of claim 10 wherein the body is fabricated from a low-expansion metal alloy having a thermal expansion coefficient of about 5 ppm/°C. and wherein said screws are fabricated from low-expansion coefficient stainless steel having a thermal expansion coefficient of about 10 ppm/°C.

12. The fiber ferrule holder of claim 2 wherein said means for securing the ferrule in the passageway comprises a means for applying a force to the ferrule substantially perpendicular to its longitudinal axis, the point of applications of the force positioned with respect to the passageway flats such that application of said force establishes three-point contact between said ferrule and said holder.

13. A fiber Fabry-Perot filter which comprises:
    a fiber ferrule assembly having an optical cavity therein which comprises a first and a second ferrule element each of which has a substantially axial bore therethrough for receiving an optical fiber and a mirror transverse to said axial bore and each of which ferrules has an internal end; said ferrules positioned with respect to each other such that the internal ends of said ferrules are opposed forming said optical cavity between opposing reflective surfaces of said mirrors; and
    a means for supporting and aligning the fibers of said ferrules which comprises:
        a first and a second ferrule holder each of which holders comprises:
            a unitary body having a passageway extending the longitudinal length of the body for receiving said ferrule, said passageway shaped along its longitudinal length to provide flats for three-point contact between said ferrule and said body;
            means for securing said ferrule in said ferrule holder to establish said three-point contact; and
            means for receiving and bonding to a piezoelectric transducer at an internal longitudinal end of said holder; and a piezoelectric transducer for electronically changing the length of said optical cavity interposed between and bonded to the internal ends of said first and second ferrules such that the length of the optical cavity can be changed by application of a voltage to the piezoelectric transducer.

14. The FFP of claim 13 wherein the body of said holder is fabricated from a material having a thermal expansion coefficient that is within a factor of two higher or lower than that of the ferrule material.

15. The FFP of claim 13 wherein the fiber ferrules are Pyrex TM fiber ferrules and wherein the holder body is fabricated from a low-expansion metal alloy having a thermal expansion coefficient at room temperature of between about 5.4–1.8 ppm/°C.

16. The FFP of claim 14 wherein the holder body is fabricated from a low-expansion metal alloy having a thermal expansion coefficient of about 5.0 ppm/°C. and wherein said screws are fabricated from stainless steel.

17. The FFP of claim 14 wherein said means for securing said ferrule in said shaped passageway to establish three-point contact comprises:
a plurality of tapped holes for receiving screws positioned in a line along the longitudinal length of the holder which extend inward from the surface of the body toward said passageway; and
ferrule retention means intermediate between the bottom of each of said tapped holes and said passageway and positioned such that tightening a screw into a tapped hole displaces said ferrule retention means such that it contacts and thereby secures said ferrule in said passageway.

18. The FFP of claim 17 wherein said ferrule retention means comprises a resilient arm intermediate between said tapped holes and a ferrule in said passageway which extends from the holder body under each of said tapped holes, which forms a portion of said shaped passageway and provides a flat in said shaped passageway such that a screw tightened into a tapped hole downwardly displaces said arm to contact and secure said ferrule in said shaped passageway thereby forming said three-point contact.

19. The FFP of claim 18 wherein said passageway is generally cylindrical but has three substantially flat surfaces along its longitudinal length positioned equiangularly around the circumference of said passageway for contacting said ferrule and wherein said line of tapped screw holes is positioned above one of said flat surfaces within the passageway.

20. The FFP of claim 19 for use with Pyrex TM ferrules wherein said body is fabricated from a low-expansion metal alloy having a thermal expansion coefficient at room temperature of between about 5.4 and about 1.8 ppm/°C.

21. The FFP of claim 20 wherein the body is fabricated from a low-expansion metal alloy having a thermal expansion coefficient of about 5 ppm/°C. and wherein said screws are fabricated from low-expansion coefficient stainless steel having a thermal expansion coefficient of about 10 ppm/°C.

22. The FFP of claim 21 which is mounted on a circuit board and wherein the FFP is miniaturized having a height of about 6.8 cm or less.

23. The FFP of claim 13 further comprising a means for selectively adjusting the thermal expansion coefficient of the filter after it has been constructed.

24. The fiber ferrule holder of claim 13 wherein said means for securing the ferrule in the passageway comprises a means for applying a force to the ferrule substantially perpendicular to its longitudinal axis, the point of applications of the force positioned with respect to the passageway flats such that application of said force establishes three-point contact between said ferrule and said holder.

* * * * *

UNITED STATES PATENT AND TRADEMARK OFFICE
CERTIFICATE OF CORRECTION

PATENT NO. : 5,422,970
DATED : June 6, 1995
INVENTOR(S) : Miller, C.M. and Miller, J.W.

It is certified that error appears in the above-indentified patent and that said Letters Patent is hereby corrected as shown below:

Column 3, lines 13 - 14, replace Attorney Docket Numbers 19-91, 20-91, 2-92 and 24-93 with U.S. Patent Serial Numbers 5,289,552; 5,212,745, 5,212,746; and 5,375,181 respectively.

Signed and Sealed this

Twenty-third Day of January, 1996

Attest:

BRUCE LEHMAN

*Attesting Officer*     *Commissioner of Patents and Trademarks*